DELAY TIMER

Filed Dec. 17, 1962 2 Sheets-Sheet 1

INVENTOR

Laurence R. Alexander,

BY Watson, Cole, Grindle & Watson

ATTORNEYS

INVENTOR
Laurence R. Alexander,
BY Watson, Cole, Grindle & Watson
ATTORNEYS

United States Patent Office 3,273,070

Patented Sept. 13, 1966

3,273,070

DELAY TIMER

Laurence R. Alexander, Armonk Village, N.Y., assignor to Leesona Corporation, Warwick, R.I., a corporation of Massachusetts Filed Dec. 17, 1962, Ser. No. 245,157

7 Claims. (Cl. 328—84)

This invention relates to a delay timer and more particularly, to a delay timer which operates electrically accurately to perform a delay operation for an extended interval of time.

Delay timers which operate electronically are well known in the art. One such example of an electronic delay timer is shown in Patent No. 3,047,807, issued to Jeremiah E. Langan, on July 31, 1962. The prior art timers have been relatively limited in the periods of time over which they functioned to perform a delay operation. Delay timers for periods of one month or more either require electronic counters to accumulate short time pulses or clockwork mechanisms. One such example is a resistance capacitance network supplying a pulse periodically, for example, every five hours, to move a counter one digit step. By this method, the timer is limited only by the number of digits on the counter.

It is very difficult to provide a resistance capacitance network which operates for long time periods, such as for periods of one month or more, because the leakage of the capacitors imposes time limitations. Further, if the breakdown voltage of a gas diode in the delay network is approached too slowly, the dark current of the diode will be equal to or greater than the capacitor charging current, thereby precluding the ability to cause discharge.

Accordingly, one of the objects of this invention is to provide an improved electronic delay timer.

It is another object of this invention to provide an improved electronic delay timer which operates reliably for periods of time in excess of one month.

It is a further object of this invention to provide an improved electronic delay timer which obviates the disadvantages of circuits utilizing counters and the disadvantage in the form of time limitation in the delay timers employing resistance capacitance networks.

Briefly, in accordance with aspects of this invention, a nuclear battery is employed as a current source and this battery is employed to charge a capacitor which is connected in parallel with two branches, one branch containing a diode and a serially connected load, the other branch containing a current control device. Advantageously, the current control device acts as a current gate, whose apparent impedance is controlled by the amount and specific activity of a radioactive material contained therein and the pressure of the inert gas employed. Advantageously, the current gate may be an ionization chamber containing a radioactive isotope of an inert gas. For example, the chamber may contain krypton 85. The amount of the current which is permitted to pass through the gate is a function of the amount and radioactivity of the krypton 85. In this current gate the current handling capacity decays proportionally with the decay of radioactive material or the radioactive decay of the isotope. It is possible to employ other radioactive isotopes in which case the activity will be determined in accordance with known principles for known periods of time. Radioactive thorium, for example, has the half life of 1.9 years.

In one illustrative embodiment the radioactive battery or nuclear energy battery is connected across three parallel branches, one branch includes a capacitor, another branch includes a serially connected gas diode and load, and the third branch includes the current gate. With such an arrangement, the current gate controls the amount of charging current which passes from the nuclear energy battery into the capacitor. Initially, there is no charging current because all the current will pass through the gate. The charging current increases linearly with the decrease in effective impedance of the constant current gate which decrease results from the decrease in radioactivity of the isotope in the ionization chamber. After a predetermined period depending upon the half life of the radioactive material in the ionization chamber, the charging current increases, i.e. the charging current passing to the capacitor, and this charging current causes the potential across the plates of the capacitor to exceed the breakdown potential of the gas diode and load circuit.

Thees and various other objects and features of the invention will be more clearly understood from a reading of the detailed description of the invention in conjunction with the drawing in which.

Figure 1:
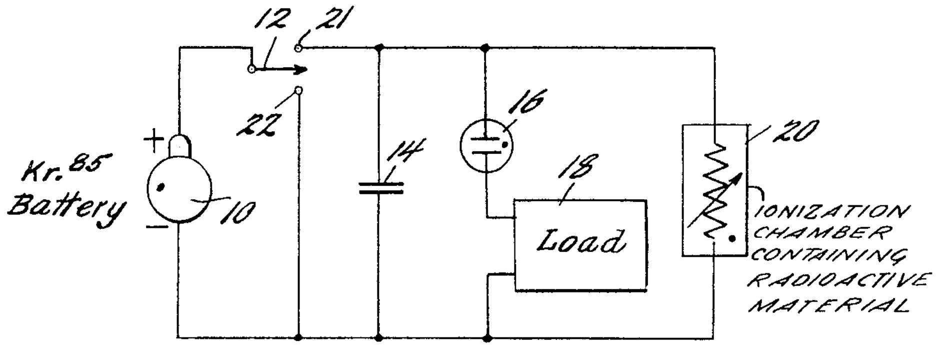
FIG. 1 is a combined schematic and block diagram of one illustrative embodiment of this invention.

Referring now to FIG. 1, there is depicted an embodiment of delay timer which includes a nuclear energy battery 10, a group of parallel branches adapted to be connected to the battery by means of a switch 12 and three parallel branches. The first parallel branch consists of a capacitor 14. The second parallel branch includes a serially connected gas diode 16 and a load 18. The third parallel branch includes an ionization chamber 20 represented in a block in which the symbol for a variable resistor is enclosed for reasons which will be subsequently explained. The switch 12 has a pair of contacts 21 and 22. The switch is normally maintained in the position of contact with contact 22 to prevent the build-up of potential across the electrodes of the battery 12 as a result of radio-activity within the battery. Thus, in its normal or quiescent condition, the battery is short circuited and does not begin to accumulate charge and develop a potential until the switch 12 is moved into a position of contact with contact 21. When it is desired to initiate the delay timing operation of the embodiment of FIG. 1, switch 12 is moved into a position of contact 21 and the subsequent radioactivity within the battery 10 causes current to be delivered to the terminal 21 at a known rate. If only the capacitor 14 were connected across the battery, then the capacitor 14 would charge at a linear rate. The presence of the ionization chamber 20 in parallel with capacitor 14 represents a short circuit or a low impedance bypass for the capacitor, the impedance of which increases slowly in accordance with the decrease in ionization of the gas within the chamber 20. Thus, the capacitor does not receive any charge until the capacity of the gate is below the current produced by the battery, at which point the capacitor charges at a very slow rate and the rate increases in accordance with the increase in impedance of the ionization chamber 20. After a period of time determined by the ionization chamber 20 and the capacitance of capacitor 14 as well as the current capacity of the battery 10, the potential on capacitor 14 reaches a value which exceeds the breakdown voltage of the diode. When the potential across capacitor 14 exceeds the breakdown potential of diode 16, diode 16 breaks down or ionizes and conducts a pulse to load 18. Load 18, which preferably exhibits an effective resistive input impedance, includes circuitry for responding to this pulse of current to deliver an output signal indicative of the end of the predetermined period.

Figure 3:
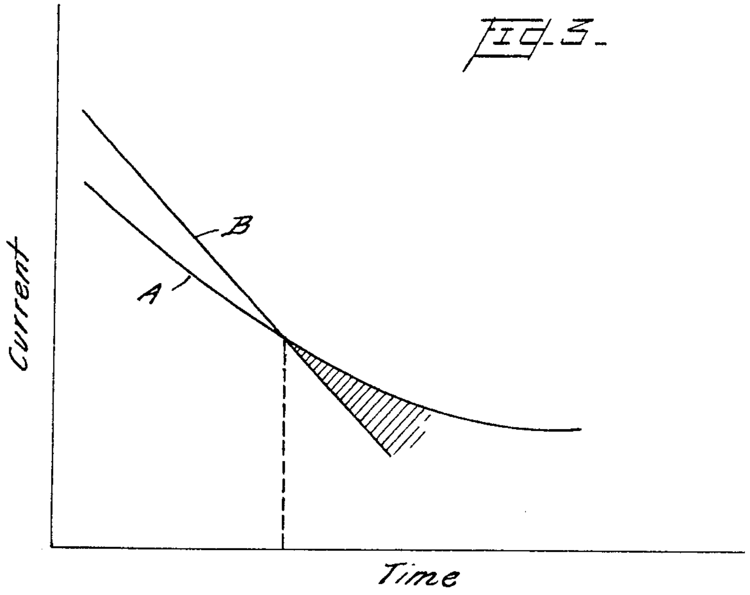
FIG. 3 is a time plot of the operative currents of the embodiment of FIG. 1; and, FIG. 4 is a group of time plots of the operative currents of the embodiment of FIG. 2.

The operation of the embodiment of FIG. 1 is graphically represented in FIG. 3 in which a pair of curves A and B represent the current from the battery and the current capacity of the ionization chamber 20, respectively. In the left-hand portion of FIG. 3, the current capacitor of the ionization chamber is greater than the output current A of the battery 10 because the current capacity of the chamber 20 decreases linearly with the radioactive decay, as indicated by a substantially straight line B. The current capacity eventually decreases below the output current of the battery, as indicated by a vertical dotted line. After this point in time is reached, the resistor capacitor network starts charging at a rate equal to the difference in abscissa of curves A and B, as indicated by the shaded portion between these curves. It will be apparent that the area of this shaded portion is increasing with time and therefore, the charging rate of capacitor 14 increases with time.

Figure 2:
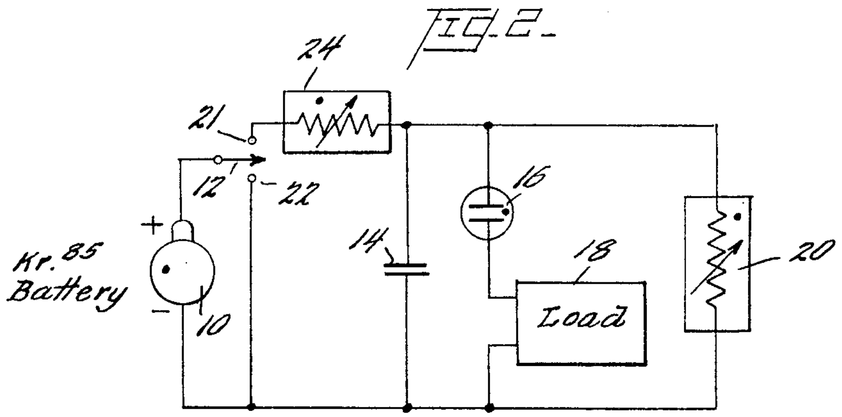
FIG. 2 is a combined schematic and block diagram of another illustrative embodiment of this invention.

Referring now to FIG. 2, there is depicted another embodiment of this invention which differs from the embodiment of FIG. 1 in the insertion of a second current gate or ionization chamber 24 between the terminal 21 and the parallel connected branches including capacitor 14, the branch containing serially connected diode 16 and load 18, and the branch containing the ionization chamber 20. The purpose of the modification of FIG. 2 is to obviate a disadvantage incident to the arrangement of FIG. 1. In the embodiment of FIG. 1 the battery 10 will decay over an extended period, such as of the order of 14 months, and this decay will be of the order of 10%. The insertion of a second ionization chamber 24 containing radium as its isotope will give a constant I output (since the radium has a half life of approximately 1,000 years) to RC network. Therefore, in calculating time one need only be concerned with the half life of the ionization chamber 20.

One of the important features of this invention is the relationship between the half life of the radioactive material in the battery 10 and the radioactive material in the ionization chamber 20. Necessarily, the isotope employed in the ionization chamber 20 has a shorter half life than the isotope of the battery 10. In this particular embodiment, the battery 10 contains krypton 85 which has a ten year half life. The ionization chamber 20 might contain material such as thorium which has a half life of 1.9 years. With respect to the operation of the embodiment of FIG. 1, the following condition is assumed:

The isotope in the ionization chamber has a half life of one year and the following conditions prevail: At $T=$ zero the ionization chamber will pass $10^{-9}$ amperes, if the battery produces $5\times10^{-10}$ amperes at $T=$zero all of the battery current will flow to ground and the capacitor will not receive any charge.

At the end of one year the ionization chamber will pass only $5\times10^{-10}$ amperes.

Assume that, in order to fire the diode, it is necessary to charge the capacitor with a current greater than $5\times10^{-11}$ amperes, it can be seen that the charging rate will reach that point when the ionization chamber passes only $4.5\times10^{-10}$ amperes. This point will be reached in approximately fourteen months.

When the current through the ionization chamber is $4.5\times10^{-10}$ amperes and the current from the battery is $5\times10^{-10}$, $5\times10^{-10}$ amperes will flow into the capacitor. The capacitor will then charge to the breakdown voltage of the diode. If we assume the diode to have a 400 volt breakdown or firing voltage, the time required to reach breakdown will be fourteen months plus the time required to reach 400 volts. This time is called $Tc$. $Tc=CV./1$.

Assume:

$V=400$ volts
$I=5\times10^{-11}$ amp
$C=1\times10^{-9}$ farads $$Tc=\frac{1\times10^{-9}\times400}{5\times10^{-11}}=\frac{4\times10^{-7}}{5\times10^{-11}}=4\times.2\times10^{4}=8\times10^{3}$$

$Tc=8\times10^{3}$ or 8,000 sec.
$Tc=2.2$ hrs.

Figure 4:
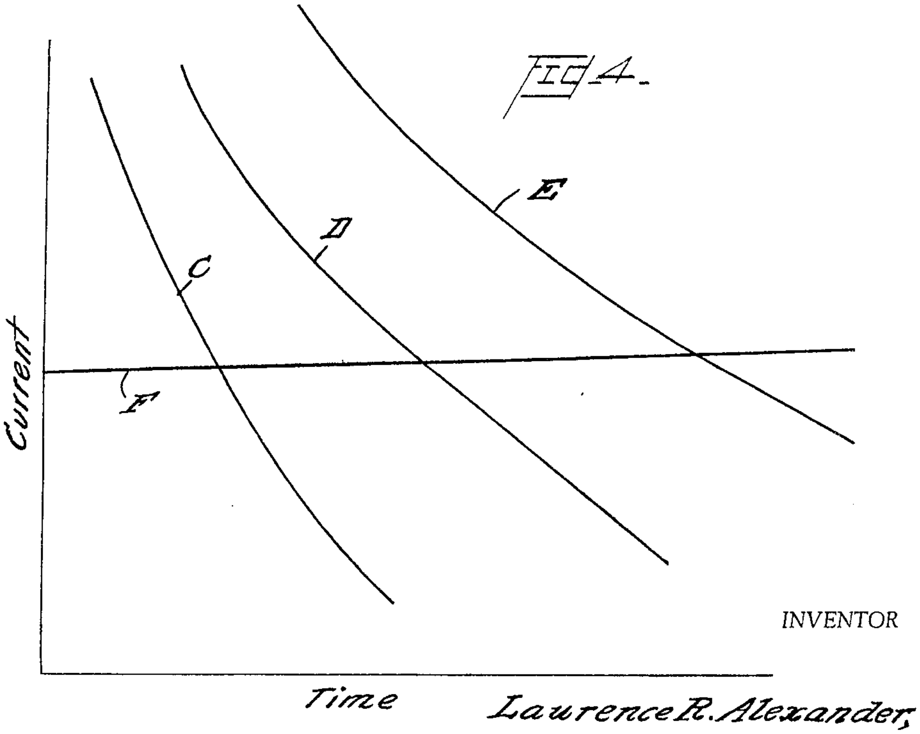

In the embodiment of FIG. 2, if the ionization chamber 24 contains an isotope such as radium (half life 1500 years or more) the current passing through it will be constant for any usable period of time, as indicated by line F in FIG. 4. In this case it is necessary to ensure the availability of current from the battery 10 exceeding the current through ionization chamber 24 for the useful life of the device. This then could be any time up to twenty or thirty or more years. After the current is limited by the ionization chamber 24, the remainder of the circuit acts or operates in the manner similar to that of the embodiment of FIG. 1. Curves C, D and E of FIG. 4 represent various current capacity curves for the ionization chamber 20 utilizing different isotopes, i.e. isotopes having a different half life. As indicated by these curves, it is possible by selecting the isotopes having the required half life to produce a cross-over point between the appropriate curve C, D and E and the available output current indicated by the curve F. From the explanation of FIG. 3 it will be apparent that the capacitor 14 of the embodiment in FIG. 2 begins to change at the time that the radioactive material in the chamber 20 decays to the cross-over point or the point of intersection with the line F.

While I have shown and described two illustrative embodiments of this invention, it is understood that the concepts thereof can be applied to other embodimets without departing from the spirit and scope of this invention. For example, the radioactive material in the ionization chamber 20 can be solid or gaseous, it can be a Beta or Gamma emitter with an isotope on the outside of the gaseous path.

What is claimed is:

1. A time delay network including a radioactive battery, a charging circuit adapted to be connected to said battery, said charging circuit including a capacitor, and a current gating device shunting current flow from said battery from said capacitor wherein said gating device has a slowly decaying deduction of current flow characteristic and means for connecting this parallel network to said battery, said circuit further including voltage responsive threshold means and a load connected in series with the series arrangement connected in parallel with said capacitor to pass current to said load when said capacitor is charged above the threshold value.

2. The embodiment according to claim 1, wherein said voltage responsive means is a gas diode.

3. The embodiment according to claim 1, wherein said current gating device is an ionization chamber having therein a radioactive material with an extended period of half-life.

4. A time delay circuit comprising a radioactive battery, a charging circuit adapted to be connected to said battery, said charging circuit including a capacitor and a constant current device having a constant current capacity characteristic extending substantially constant over a period exceeding a year connected between said battery and said capacitor, a parallel network connected to said capacitor including a constant current gating device having a decaying current flow characteristic extending over a time period exceeding one month and a parallel branch including voltage responsive threshold means and a serially connected load to pass current to said load when the capacitor is charged with a voltage exceeding the threshold voltage of said threshold means.

5. An arrangement according to claim 1, including a switch having a first contact for connecting said radioactive battery to said first metioned current limiting device and including a second contact arrangement for short circuiting said battery.

6. A time delay network according to claim 5, wherein said first mentioned current limiting device is a ionization chamber with an extended half-life radioactive material therein such as radium.

7. A time delay network according to claim 5, wherein said last mentioned current limiting device is an ionization chamber with the radioactive material therein having a half-life characteristic exhibited over a period of at least several months.

References Cited by the Examiner

UNITED STATES PATENTS

| | | | |
|---|---|---|---|
| 2,839,688 | 6/1958 | Anton | 250—83 |
| 3,115,595 | 10/1963 | Marshall | 328—210 |

ARTHUR GAUSS, *Primary Examiner.*

J. BUSCH, *Assistant Examiner.*